United States Patent
Shogaki et al.

(10) Patent No.: US 10,664,263 B2
(45) Date of Patent: May 26, 2020

(54) SOFTWARE MANAGEMENT SYSTEM, SOFTWARE UPDATER, SOFTWARE UPDATING METHOD, AND NON-TRANSITORY COMPUTER-READABLE STORAGE MEDIUM STORING SOFTWARE UPDATE PROGRAM

(71) Applicant: KABUSHIKI KAISHA YASKAWA DENKI, Kitakyushu-shi (JP)

(72) Inventors: Takaaki Shogaki, Kitakyushi (JP); Atsunobu Sakata, Kitakyushu (JP); Tadashi Okubo, Kitakyushi (JP); Dai Fukuda, Kitakyushu (JP); Toshinobu Kira, Kitakyushu (JP); Amane Ando, Kitakyushu (JP)

(73) Assignee: KABUSHIKI KAISHA YASKAWA DENKI, Kitakyushu-shi (JP)

( * ) Notice: Subject to any disclaimer, the term of this patent is extended or adjusted under 35 U.S.C. 154(b) by 48 days.

(21) Appl. No.: 15/962,423

(22) Filed: Apr. 25, 2018

(65) Prior Publication Data
US 2019/0102160 A1   Apr. 4, 2019

(30) Foreign Application Priority Data
Oct. 3, 2017  (JP) ................. 2017-193803

(51) Int. Cl.
*G06F 9/44* (2018.01)
*G06F 8/65* (2018.01)
(Continued)

(52) U.S. Cl.
CPC .............. *G06F 8/65* (2013.01); *G06F 21/105* (2013.01); *H04L 63/0435* (2013.01);
(Continued)

(58) Field of Classification Search
None
See application file for complete search history.

(56) References Cited

U.S. PATENT DOCUMENTS

2007/0038589 A1*  2/2007  Brockhaus ............. G06F 21/10
2008/0046881 A1*  2/2008  Braghiroli ................ G06F 8/65
                                                            717/173

FOREIGN PATENT DOCUMENTS

JP   2000-66977 A    3/2000
JP   2003-029819 A   1/2003
(Continued)

OTHER PUBLICATIONS

Office Action dated Jan. 8, 2019 in Japanese Patent Application No. 2017-193803, 17 pages (with unedited computer generated English translation).

(Continued)

*Primary Examiner* — Qamrun Nahar
(74) *Attorney, Agent, or Firm* — Oblon, McClelland, Maier & Neustadt, L.L.P.

(57) ABSTRACT

A software management system includes a control system connected to a first network and including at least one of control circuitry and a sensor, each controllable by updating first control software in the respective at least one of the control circuitry and sensor, a software distribution device including first circuitry that stores second control software and transmits the second software through a second network, and a software update device including second circuitry that, while the software device is connected to the second network, receives the second software from the distribution device and stores the second software, and while the update device is connected to the first network, transmits the second software to the respective at least one of the control circuitry and sensor to cause the respective at least one of the control circuitry and sensor to update the first software using the second software.

20 Claims, 8 Drawing Sheets

(51) Int. Cl.
*H04L 29/06* (2006.01)
*G06F 21/10* (2013.01)
*H04L 29/08* (2006.01)

(52) U.S. Cl.
CPC ...... *H04L 67/34* (2013.01); *G06F 2221/2101* (2013.01); *H04L 67/10* (2013.01)

(56) References Cited

FOREIGN PATENT DOCUMENTS

| | | |
|---|---|---|
| JP | 2003-152806 A | 5/2003 |
| JP | 2003-202931 A | 7/2003 |
| JP | 2005-215986 A | 8/2005 |
| JP | 2009-111758 A | 5/2009 |
| JP | 2013-145504 A | 7/2013 |
| JP | 2016-200942 A | 12/2016 |

OTHER PUBLICATIONS

Office Action dated Aug. 5, 2019 in Japanese Patent Application No. 2017-193803, 7 pages (with unedited computer generated English translation).
Sugimoto, T. et al "Next-Generation Solution/ Policy Development Point, Guidelines for Creating a High-Security Environment" SunWorld, vol. 11, No. 9, 2001, 19 pages (with partial English translation).

\* cited by examiner

FIG. 7

Log-in history database (sorted by account, log-in operation basis)

| No. | Log-in date and time | Log-in user | Instrument type | Software version | License key | Download date | Update date |
|---|---|---|---|---|---|---|---|
| 1 | 2017/7/18 | ○○ ○○○ | SGC-1234 | 0024 | 875bR42h | 7/18 | 7/18 |
| 2 | 2017/8/7 | ×× ×× | SGA-4321B | 0029 | 97SL52Ym | 8/7 | 8/7 |
|   |   |   | SGF-1122 | 0027 |   | 8/7 | 8/7 |
| 3 | 2017/8/22 | △△ △△ | SGC-5533 | 0006 | ——— | —/— | —/— |
| 4 | 2017/8/25 | ○○ ○○○ | SGB-6789A | 0022 | K58Hk1w4 | 8/25 | 8/25 |
| ... | ... | ... | ... | ... | ... | ... | ... |

SOFTWARE MANAGEMENT SYSTEM, SOFTWARE UPDATER, SOFTWARE UPDATING METHOD, AND NON-TRANSITORY COMPUTER-READABLE STORAGE MEDIUM STORING SOFTWARE UPDATE PROGRAM

CROSS-REFERENCE TO RELATED APPLICATIONS

The present application claims priority under 35 U.S.C. § 119 to Japanese Patent Application No. 2017-193803, filed Oct. 3, 2017. The contents of this application are incorporated herein by reference in their entirety.

BACKGROUND

Field of the Invention

The embodiments disclosed herein relate to a software management system, a software updater, a software updating method, and a non-transitory computer-readable storage medium storing a software update program.

Discussion of the Background

JP 2003-029819A discloses a maintenance unit that updates user's software to corrected software. The user's software is stored in a controller that controls a machine, an instrument, or another kind of equipment disposed in the user's workplace, such as a factory and a plant. The corrected software is received from a vendor's management unit through the Internet.

SUMMARY

According to one aspect of the present invention, a software management system includes a control system connected to a first network and including at least one of control circuitry and a sensor, each controllable by updating first control software disposed in the respective at least one of the control circuitry and the sensor, a software distribution device including first circuitry that stores second control software and transmits the second control software through a second network, and a software update device including second circuitry that, while the software update device is connected to the second network, receives the second control software from the software distribution device and stores the second control software, and while the software update device is connected to the first network, transmits the second control software to the respective at least one of the control circuitry and the sensor to cause the respective at least one of the control circuitry and the sensor to update the first control software using the second control software.

According to another aspect of the present invention, a software update device includes circuitry that receives encoded control software and predetermined key data, the encoded control software being encoded based on the predetermined key data, decodes the encoded control software based on the predetermined key data, and causes at least one of a control circuitry and a sensor to update control software of the respective at least one of the control circuitry and the sensor using the decoded control software.

According to yet another aspect of the present invention, a software updating method executable by software update device includes receiving encoded control software and predetermined key data, the encoded control software being encoded based on the predetermined key data, outputting the received predetermined key data, inputting the received predetermined key data, decoding the received control software based on the input predetermined key data, and causing at least one of a control circuitry and a sensor to update the control software of the respective at least one of the control circuitry and the sensor using the decoded control software.

According to still another aspect of the present invention, a non-transitory computer-readable storage medium storing a software update program for causing an arithmetic and/or logic operator of a software update device to execute processing. The processing includes receiving encoded control software and predetermined key data, the encoded control software being encoded based on the predetermined key data, outputting the received predetermined key data, inputting the received predetermined key data, decoding the received control software based on the input predetermined key data, and causing at least one of a control circuitry and a sensor to update control software of the respective at least one of the control circuitry and the sensor using the decoded control software.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein:

FIG. 7 illustrates exemplary registered items of a log-in history database and an example of how they are shown.

DESCRIPTION OF THE EMBODIMENTS

Figure 1:
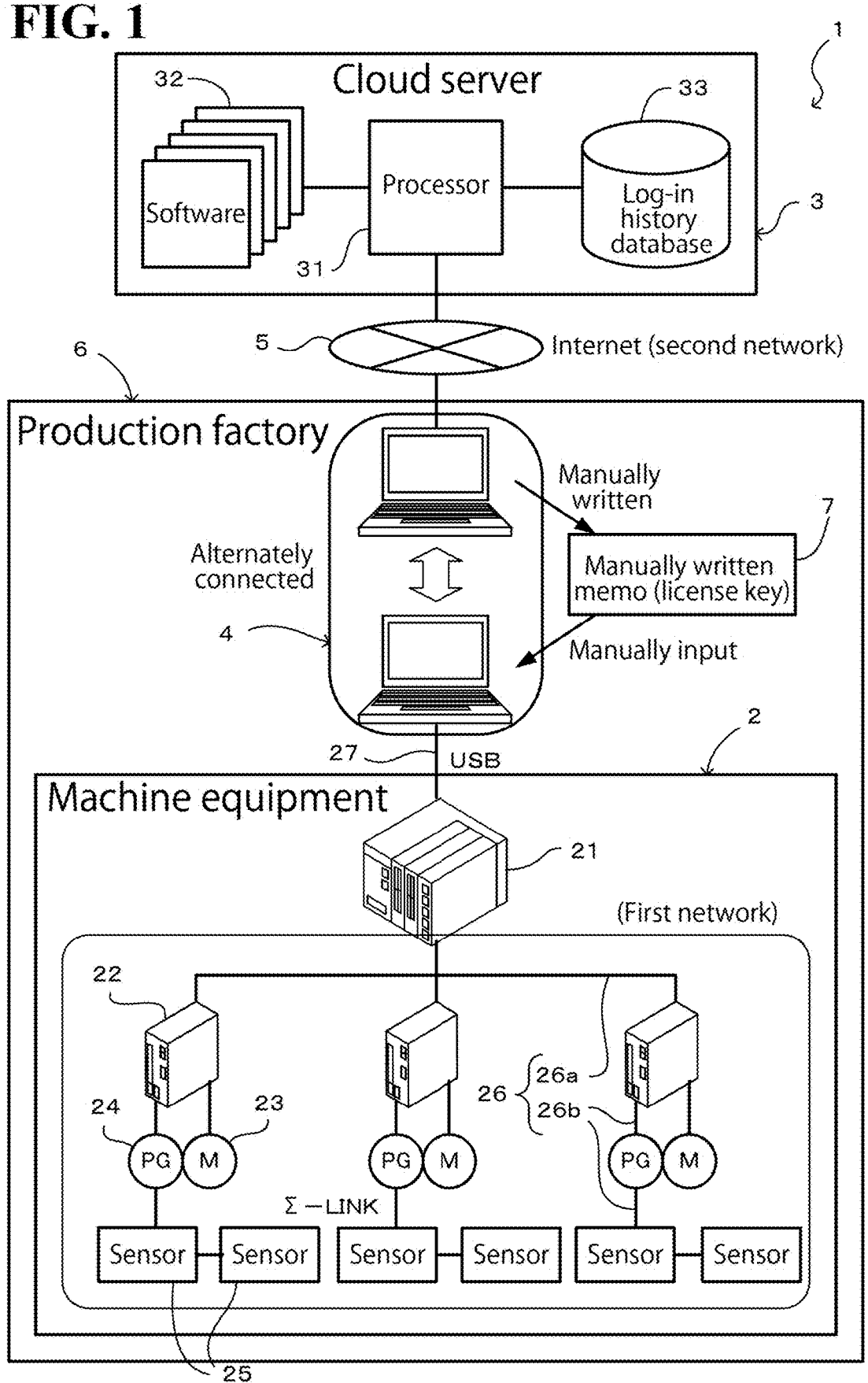
FIG. 1 is a functional block diagram schematically illustrating a configuration of a software management system according to an embodiment.

The embodiments will now be described with reference to the accompanying drawings, wherein like reference numerals designate corresponding or identical elements throughout the various drawings.

Schematic Configuration of Software Management System

FIG. 1 is a functional block diagram schematically illustrating a configuration of a software management system 1 according to this embodiment.

The software management system 1 manages update of control software disposed in each of controlled instruments of machine equipment in production factories, plants, and other industrial facilities. Specifically, the software management system 1 replaces the control software with an update version (new version) of the control software received from a cloud server through the Internet.

In FIG. 1, the software management system 1 includes a machine equipment 2, a cloud server 3, and an updater 4. It is noted that FIG. 1 shows how the elements of the software management system 1 are connected to each other through signal lines, enabling information signals to be transmitted and received between the elements, and that an internal configuration of each element will be detailed later. The above-described elements will be described below.

As illustrated in FIG. 1, the machine equipment 2 (control system) is production machinery that is drive-controlled using a plurality of motors. Specifically, the machine equipment 2 includes a single upper-level controller 21, a plurality of motor controllers 22, a plurality of motors 23, a plurality of encoders 24, and a plurality of external sensors 25. Each motor 23 and each encoder 24 are connected to a corresponding motor controller 22. Each external sensor 25 (simply termed "sensor" in FIG. 1) is connected in series to a field network (described later) that connects the motor controller 22 and the encoder 24 to each other.

The upper-level controller 21 controls the plurality of motors 23 of the machine equipment 2 to cooperate. For this purpose, the upper-level controller 21 receives various kinds of state information from the motor controllers 22, and, based on the various kinds of state information, transmits a control command to each individual motor controller 22. The upper-level controller 21 is connected to the motor controllers 22 through a machine control-dedicated "field network" 26a (first network) so that information can be transmitted and received between the upper-level controller 21 and the motor controllers 22. A non-limiting example of the field network 26a is MECHATROLINK (registered trademark). The upper-level controller 21 is also connected to the updater 4, described later, through a cable (in the embodiment illustrated in FIG. 1, USB cable 27) so that information can be transmitted and received between the upper-level controller 21 and the updater 4.

Each motor controller 22 receives various kinds of state information from the encoder 24 and the external sensors 25, and based on the various kinds of state information and the control command received from the upper-level controller 21, feeds driving electric power to the motor 23 so as to control the motor 23. The motor controller 22 also transmits the received state information to the upper-level controller 21. The motor controller 22 is connected to the encoder 24 and the external sensors 25 through a field network 26b (first network) so that information can be received from the encoder 24 and the external sensors 25. The field network 26b, such as Σ-LINK (registered trademark), is dedicated to transmission and receipt of state information. The upper-level controller 21 and the motor controllers 22 are non-limiting examples of the controller recited in the appended claims, and the encoders 24 and the external sensors 25 are non-limiting examples of the sensor recited in the appended claims. The motor controller 22 is also connected to the updater 4, described later, through a cable (for example, USB cable) so that information can be transmitted and received between the motor controller 22 and the updater 4 (this transmission and receipt of information is not illustrated).

The cloud server 3 (software distributor) is a manufacturer-side server for the various kinds of controlled instruments of the machine equipment 2, such as the upper-level controller 21, the motor controllers 23, the encoders 24, and the external sensors 25. The cloud server 3 is connected to a production factory 6 through a wide-area network (second network), such as the Internet, 5, so that information can be transmitted and received between the cloud server 3 and the production factory 6. The cloud server 3 stores an upgraded version of control software stored in each of the controlled instruments to control each controlled instrument (the control software is simply termed "software" in FIG. 1). With this configuration, the cloud server 3 manages distribution of control software (distribution will be hereinafter referred to as download), and manages information regarding update of control software. An internal configuration of the cloud server 3 will be described in detail later by referring to FIG. 2.

The updater 4 (software updater) is implemented in the form of an easy-to-carry laptop general-purpose personal computer (hereinafter referred to as laptop PC). The updater 4 performs various kinds of processing associated with control software and instrument information using tool applications (software update programs) operated on the operating system (OS) of the laptop PC. The updater 4 is connectable to the upper-level controller 21 through the USB cable 27, to the motor controllers 22 through USB cables (not illustrated), and to the cloud server 3 through the Internet 5. A configuration of how a tool application is operated on the updater 4 will be described in detail later by referring to FIG. 3.

Features of this Embodiment

In factory automation applications, machine equipment is in many cases implemented in the form of a control system in which various controllers (such as the upper-level controller 21 and the motor controllers 22 in this embodiment) and various sensors are connected to each other through field networks (such as field networks 26a, 26b in this embodiment) to cooperate. These controllers and sensors are controlled by processing control software stored in each of the controllers and sensors. Each control software is updatable using an upgraded version of the control software received through the field network. A more recent trend is that an upgraded version of control software is stored in a cloud server prepared by manufacturers of the controllers and/or the sensors, and a user downloads the upgraded version through the Internet.

For security considerations, including avoidance of a leakage of confidential information and protection against cyber attacking, many measures prevent the field networks from direct connection to the Internet, so that the field networks are usually off the Internet. This makes it impossible to download control software directly from the cloud server and to update the control software of each of the controllers and the sensors.

In light of the circumstances, this embodiment includes the updater 4. While the updater 4 is connected to the Internet 5, the updater 4 receives control software from the cloud server 3 and stores the control software. While the updater 4 is connected to the field network 26, the updater 4 transmits the stored control software to at least one of the controllers and the sensors so as to cause the at least one of the controllers and the sensors to update its control software using the stored control software. As described above, the updater 4 according to this embodiment is implemented in the form of a single, easy-to-carry information terminal, such as laptop PC. In this case, the updater 4 becomes connected to the Internet 5 and downloads an upgraded version of necessary control software from the cloud server 3. Then, the updater 4 is disconnected from the Internet 5 and, in turn, becomes connected to the field network 26 through the USB cable 27 and the upper-level controller 21 or through a USB cable and a motor controller 22 (this connection is not illustrated) so as to transmit the upgraded version of the control software to at least one of the controllers and the sensors and cause the at least one of the controllers and the sensors to update its control software using the upgraded version of the control software. Thus, the updater 4 changes which network to connect itself to, to the Internet 5 or to the field network 26. This configuration enables update of control software by downloading a new version of the control software while keeping the updater 4 physically disconnected from the two networks. This software management is implemented by a configuration and according to a procedure described below.

Detailed Configuration of Cloud Server

Figure 2:
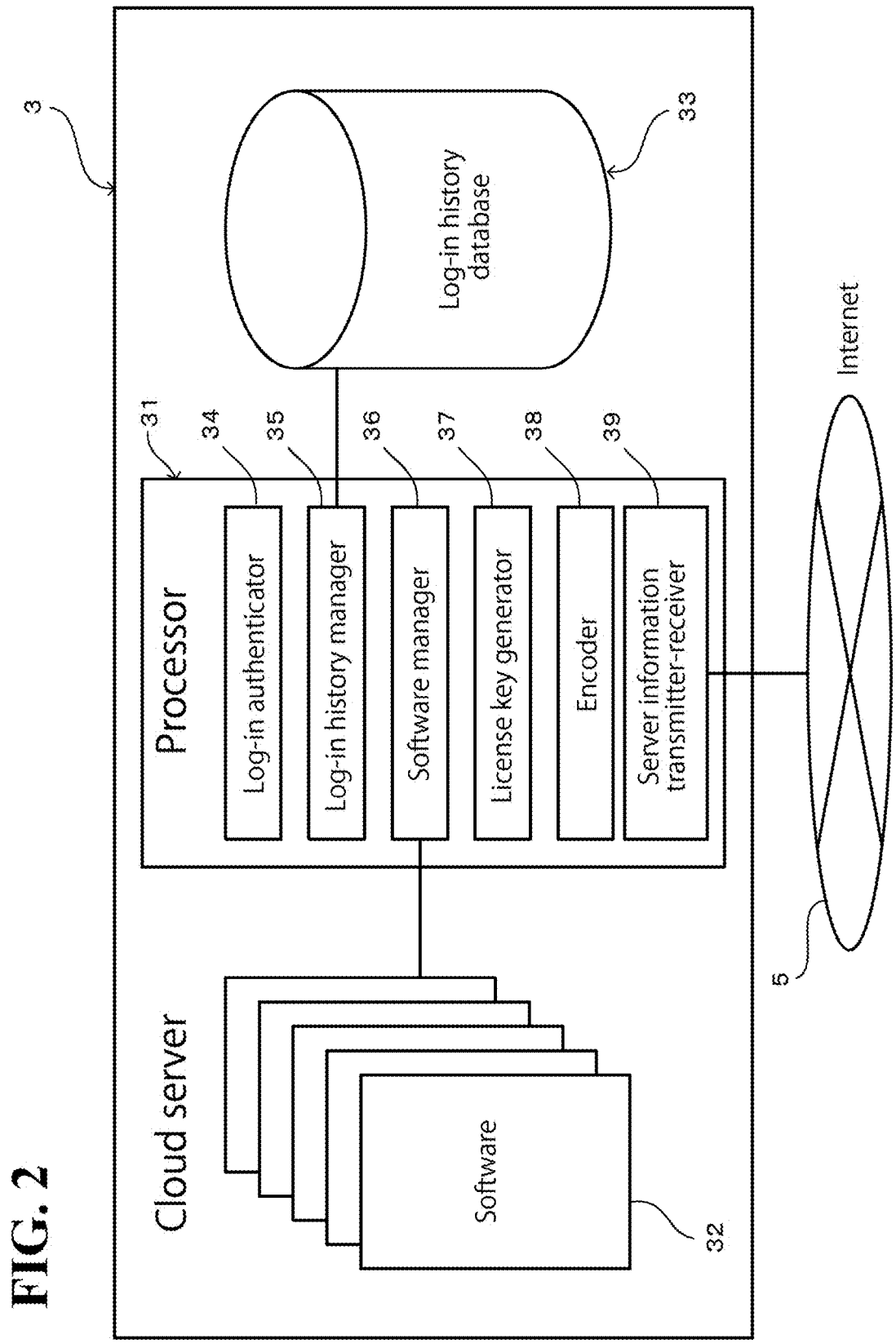
FIG. 2 is a system block diagram illustrating an internal configuration of a cloud server.

FIG. 2 is a system block diagram illustrating an internal configuration of the cloud server 3. Referring to FIG. 2, the cloud server 3 includes a processor 31, a software storage 32, and a log-in history database 33. The processor 31 is connected to the Internet 5. The software storage 32 stores various kinds of control software. The log-in history database 33 stores a log-in history.

The processor 31 performs processing in response to an operation performed by a user who is logged in the cloud server 3. Examples of the processing include: encoding and downloading control software stored in the software storage 32; and registering information exchanged during the logged-in period of time in the log-in history database 33. The processor 31 includes a log-in authenticator 34, a log-in history manager 35, a software manager 36, a license key generator 37, an encoder 38, and a server information transmitter-receiver 39.

The log-in authenticator 34 receives account information (such as account name and password) from an external terminal attempting access to the cloud server 3 through the Internet 5 (the external terminal is, in this embodiment, the updater 4). Then, the log-in authenticator 34 checks the account information to determine whether the external terminal should be given log-in permission.

The log-in history manager 35 registers in the log-in history database 33 history information associated with the log-in account authenticated at the log-in authenticator 34, and manages the registered information. Examples of the history information include log-in date and time, operations performed during the logged-in period of time, and information transmitted and received during the logged-in period of time.

The software manager 36 manages storage and acquisition of control software in the software storage 32. Specifically, in response to a download request for control software from the authenticated external terminal, the software manager 36 performs processing of obtaining the control software. The software manager 36 also performs processing of storing in the software storage 32 control software uploaded by the administrator of the cloud server 3 (managing stuff of the manufacturer, not illustrated). The control software stored at this time is not encoded yet, and may be a latest version of the control software alone or a plurality of different versions of the control software.

The license key generator 37 generates a license key (key data) every time the license key generator 37 receives a download request for control software from the external terminal. A non-limiting example of a license key is text data made up of a predetermined number (eight in FIG. 7, described later) of randomly chosen alphanumeric characters, including upper-case characters and lower-case characters. Such license key is automatically generated at the license key generator 37.

The encoder 38 uses the license key generated at the license key generator 37 as an encode key (key data) to encode the control software that the software manager 36 has obtained in response to the download request for control software from the external terminal. In this encoding processing, the license key may be used simply as a password required for decoding purposes, or the contents of the license key may be reflected in the encoding processing.

The server information transmitter-receiver 39 receives information from the external terminal through the Internet 5 according to an Internet communications protocol. Examples of the information include the above-described account information, information regarding operations performed during the logged-in period of time of the external terminal, and software update information (instrument information), described later. The server information transmitter-receiver 39 also transmits the above-described encoded control software, the license key, and/or other information to the logged-in external terminal through the Internet 5.

How the processor 31 performs its processing using these functional elements will be described in detail later by referring to FIGS. 4 and 6.

Detailed Configuration of Updater

Figure 3:
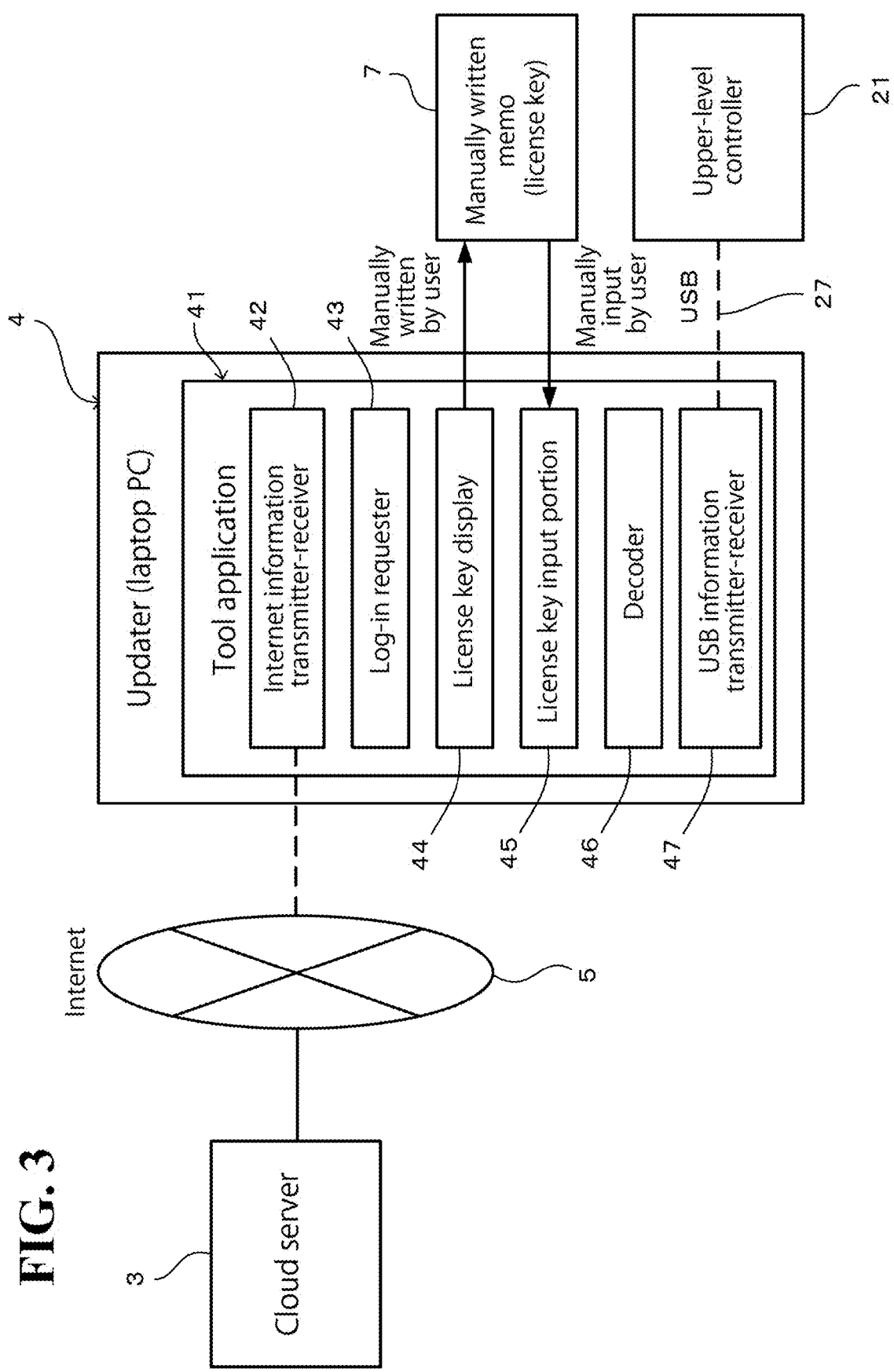
FIG. 3 is a system block diagram illustrating an internal configuration of an updater.

FIG. 3 is a system block diagram illustrating an internal configuration of the updater 4. Referring to FIG. 3, the updater 4, which is implemented in the form of a general-purpose laptop PC, includes a tool application 41. The tool application 41 is operated on the OS of the laptop PC to perform various kinds of processing associated with the control software and the instrument information. The tool application 41 includes software blocks, namely, an Internet information transmitter-receiver 42, a log-in requester 43, a license key display 44, a license key input portion 45, a decoder 46, and a USB information transmitter-receiver 47.

The Internet information transmitter-receiver 42 (receiver) transmits information to the cloud server 3 through the Internet 5 according to an Internet communications protocol. Examples of the information include the account information, information regarding operations performed during the logged-in period of time, and software update information, described later. The Internet information transmitter-receiver 42 also receives the encoded control software, the license key, and/or other information from the cloud server 3, which is now logged in, through the Internet 5. In this embodiment, after the Internet information transmitter-receiver 42 has transmitted the software update information, described later, to the cloud server 3, the Internet information transmitter-receiver 42 deletes the software update information, including the license key, from the various storages (memory, hard disk drive (HDD), and external storage, not illustrated).

The log-in requester 43 transmits the account information to the cloud server 3 attempting access to the updater 4 through the Internet 5 so as to request log-in permission.

The license key display 44 (outputter) displays, on a display device (not illustrated), the license key downloaded from the cloud server 3 together with the encoded control software. In this embodiment, the license key display 44 displays the license key only during the logged-in period of time, in which the license key is downloaded, and after the logged-in period of time, the license key display 44 deletes the license key from the various storages.

Also in this embodiment, the Internet info nation transmitter-receiver 42, the log-in requester 43, and the license key display 44 perform their functions while the updater 4 is not connected to any controlled instruments through the USB cable 27 and is connected to the Internet 5.

The license key input portion 45 (input portion) receives the license key input from the user through an input device such as a keyboard (not illustrated).

The decoder 46 decodes the encoded control software received by the Internet information transmitter-receiver 42 based on the license key received by the license key input portion 45. This license key-utilizing decoding processing uses a cryptographic algorithm identical to the cryptographic algorithm used in the encoder 38 of the cloud server 3.

The USB information transmitter-receiver 47 (updater) transmits the decoded control software and transmission destination information (which indicates where to transmit the decoded control software, examples including ID of the instrument to be updated) to the upper-level controller 21 through the USB cable 27 according to a USB communications protocol. The USB information transmitter-receiver 47 also receives instrument information regarding the controlled instruments connected to the field network 26 from the upper-level controller 21 through the USB cable 27 according to the USB communications protocol. In another possible embodiment, not illustrated, the USB information transmitter-receiver 47 may also transmit the decoded control software and transmission destination information (which indicates where to transmit the decoded control software, examples including ID of the instrument to be updated) to the motor controller 22 through a USB cable according to a USB communications protocol; and receive instrument information regarding the controlled instruments connected to the field network 26 from the motor controller 22 through the USB cable according to the USB communications protocol. In this embodiment, after the USB information transmitter-receiver 47 has transmitted the decoded control software, the USB information transmitter-receiver 47 deletes the decoded control software from the various storages.

Also in this embodiment, the license key input portion 45, the decoder 46, and the USB information transmitter-receiver 47 perform their functions only while the updater 4 is not connected to the Internet 5 and is connected to the upper-level controller 21 (or the motor controller 22) through the USB cable 27.

How the tool application 41 performs its processing using these functional elements will be described in detail later by referring to FIGS. 4 to 6.

The upper-level controller 21 chooses a controlled instrument from among all the controlled instruments connected to the field network 26, which is MECHATROLINK (registered trademark) or Σ-LINK (registered trademark). Such controlled instruments include the motor controllers 22, the encoders 24, the external sensors 25, and even the upper-level controller 21. Then, the upper-level controller 21 transmits control software to the chosen controlled instrument so as to cause the chosen controlled instrument to perform an update sequence (this configuration of the upper-level controller 2 is not illustrated). The upper-level controller 21 also chooses a controlled instrument from among all the controlled instruments connected to the field network 26, requests instrument information of the chosen controlled instrument, and receives the instrument information. Examples of the instrument information include type of the controlled instrument and serial number of the controlled instrument.

Each motor controller 22 chooses a controlled instrument from among all the controlled instruments connected to the field network 26b (which is, in the example illustrated in FIG. 1, Σ-LINK (registered trademark)). Such controlled instruments include the encoder 24, the external sensors 25, and even the motor controller 22. Then, the motor controller 22 transmits control software to the chosen controlled instrument so as to cause the chosen controlled instrument to perform an update sequence (this configuration of the motor controller 22 is not illustrated). The motor controller 22 also chooses a controlled instrument from among all the controlled instruments connected to the field network 26b, requests instrument information of the chosen controlled instrument, and receives the instrument information. Examples of the instrument information include type of the controlled instrument and serial number of the controlled instrument.

Download Sequence of Control Software

Figure 4:
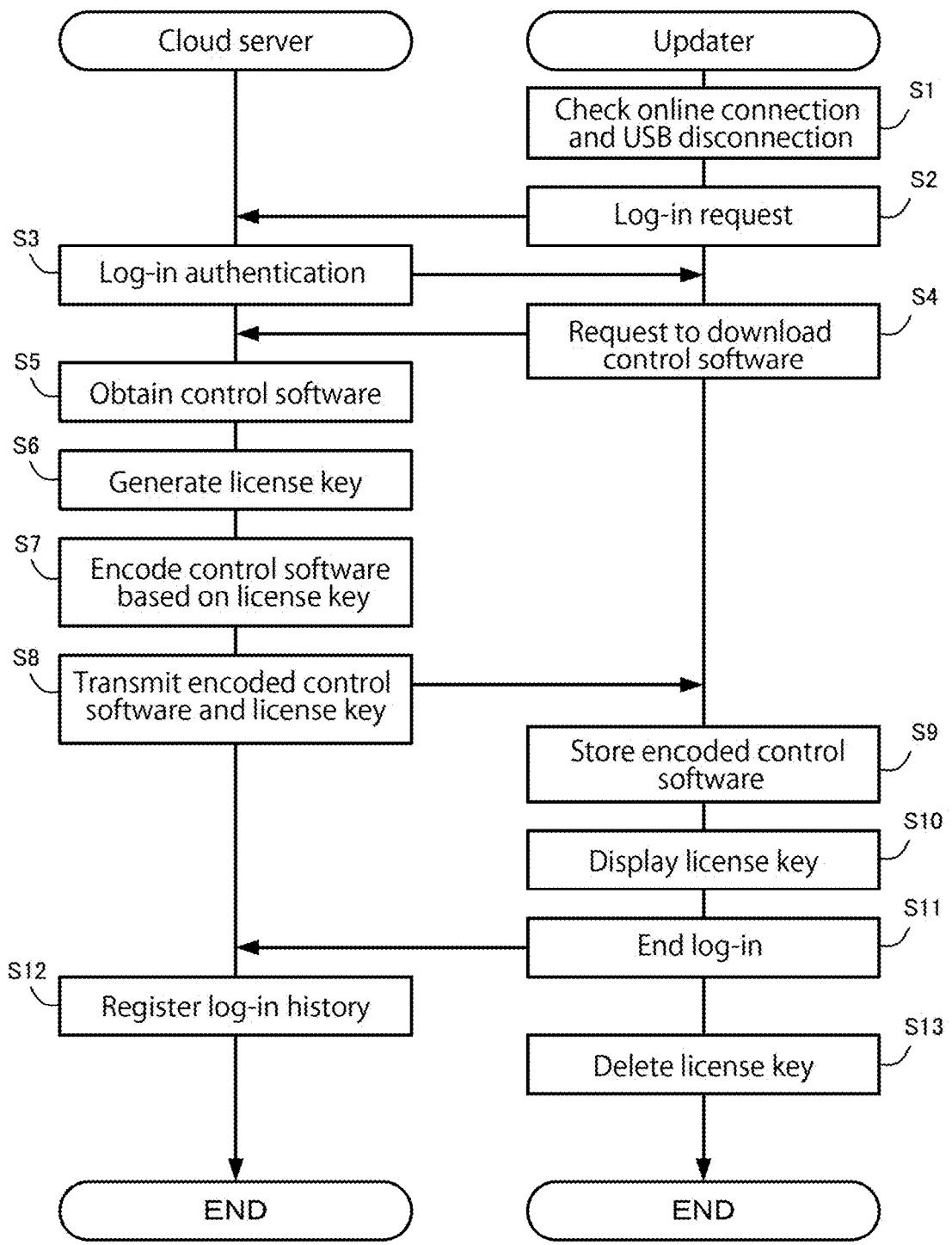
FIG. 4 is a sequence chart of a process of downloading control software.

FIG. 4 is a sequence chart of a process of downloading control software performed in the software management system 1 according to this embodiment. The download sequence illustrated in FIG. 4 starts if the updater 4 is connected to the Internet 5 and disconnected from the upper-level controller 21 (or the motor controller 22). Each step of processing performed by the cloud server 3 is implemented by the CPU (arithmetic and/or logic operator) of the cloud server 3 executing the functional elements of the processor 31. Each step of processing performed by the updater 4 is implemented by the CPU (arithmetic and/or logic operator) of the updater 4 executing the functional elements of the tool application 41 (the same applies in FIGS. 5 and 6, described later).

At step S1, the updater 4 checks its connection state at the present point of time. Specifically, the updater 4 checks whether the updater 4 is connected to the Internet 5 and is not connected to the upper-level controller 21 (or the motor controller 22) through the USB cable 27. When, at the present point of time, the updater 4 is not connected to the Internet 5 or when the updater 4 is connected to the upper-level controller 21 (or the motor controller 22), the updater 4 makes an error notification to a user and causes the tool application 41 to end its processing (not illustrated).

At the next step S2, the updater 4 causes the Internet information transmitter-receiver 42 and the log-in requester 43 to access the cloud server 3 through the Internet 5 and transmit account information to the cloud server 3, thereby making a log-in request to the cloud server 3.

At the next step S3, the cloud server 3 causes the server information transmitter-receiver 39 and the log-in authenticator 34 to check the received account information for log-in eligibility and to, when the received account information is determined as log-in eligible, transmit log-in permission to the updater 4. When the received account information is determined as not log-in eligible, the cloud server 3 causes the server information transmitter-receiver 39 and the log-in authenticator 34 to transmit a log-in error to the updater 4 (the log-in error is not illustrated).

At the next step S4, the updater 4 causes the Internet information transmitter-receiver 42 to transmit to the cloud server 3 a request to download control software identified as desired by the user's operation.

At the next step S5, the cloud server 3 causes the software manager 36 to obtain the identified control software from the software storage 32.

At the next step S6, the cloud server 3 causes the license key generator 37 to generate one license key.

At the next step S7, the cloud server 3 causes the encoder 38 to encode the control software obtained at step S5 based on the license key generated at step S6.

At the next step S8, the cloud server 3 causes the server information transmitter-receiver 39 to transmit (download) to the updater 4 the control software encoded at step S7 and the license key generated at step S6.

At the next step S9, the updater 4 causes the Internet information transmitter-receiver 42 to store the received encoded control software in a storage.

At the next step S10, the updater 4 causes the license key display 44 to display the received license key on a display device or a similar device. Then, the user of the updater 4 writes the displayed license key down on a memo pad 7 or some other writing material (see FIGS. 1 and 3).

At the next step S11, the updater 4 causes the Internet information transmitter-receiver 42 to transmit a log-in end notification to the cloud server 3.

At the next step S12, the cloud server 3 performs log-in end processing, and then causes the log-in history manager 35 to register in the log-in history database 33 history information associated with the log-in made so far. Examples of the history information include account information, operations performed during the logged-in period of time, and information transmitted and received during the logged-in period of time.

At the next step S13, the updater 4 causes the license key display 44 to delete the license key from the storage. Thus, the download sequence ends.

Update Sequence of Control Software

Figure 5:
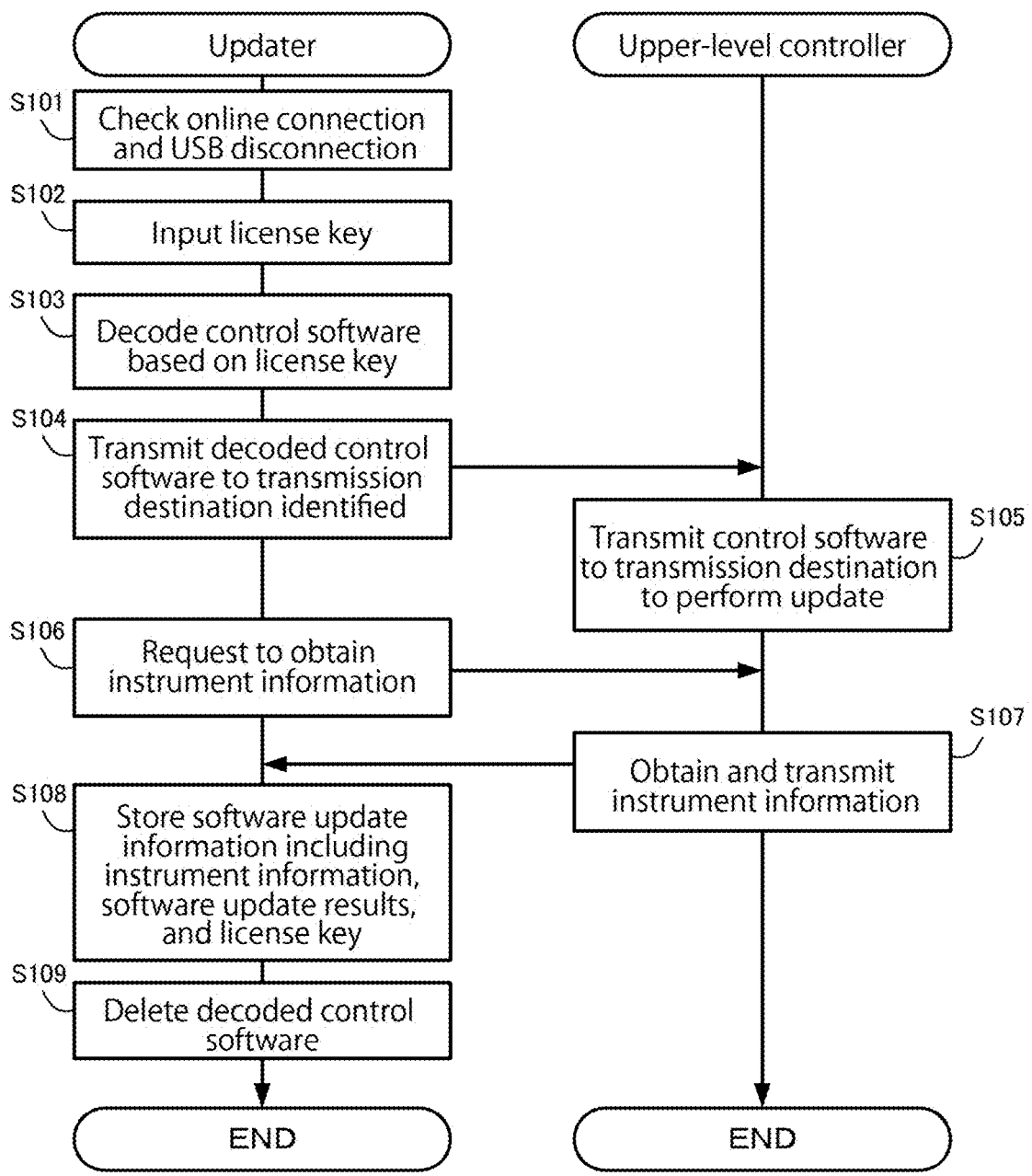
FIG. 5 is a sequence chart of a process of updating control software.

FIG. 5 is a sequence chart of a process of updating control software performed in the software management system 1 according to this embodiment. The update sequence illustrated in FIG. 5 starts if the updater 4 is disconnected from the Internet 5 and connected to the upper-level controller 21 (or the motor controller 22) through the USB cable 27. This example of sequence will be described under the assumption that the updater 4 is connected to the upper-level controller 21 (the same applies in FIG. 6, described later).

At step S101, the updater 4 checks its connection state at the present point of time. Specifically, the updater 4 checks whether the updater 4 is connected to the upper-level controller 21 through the USB cable 27 and is disconnected from the Internet 5. When, at the present point of time, the updater 4 is not connected to the upper-level controller 21 through the USB cable 27 or is connected to the Internet 5, the updater 4 makes an error notification to the user and causes the tool application 41 to end its processing (not illustrated).

At the next step S102, the updater 4 causes the license key input portion 45 to receive a license key input by the user through a keyboard or a similar input device. The user of the updater 4 inputs the license key written down on the memo pad 7 or some other writing material at step S10 of the above-described download sequence (see FIGS. 1 and 3).

At the next step S103, the updater 4 causes the decoder 46 to decode, based on the license key input at step S102, the encoded control software stored at step S9 of the above-described download sequence. When the license key does not correspond to the encoded control software (that is, when the encoded control software cannot be decoded based on this license key), the updater 4 makes a predetermined error notification and, at step S102, makes a request for re-input of license key.

At the next step S104, the updater 4 causes the USB information transmitter-receiver 47 to transmit the control software decoded at step S103 to the upper-level controller 21 through the USB cable 27. Also at step S104, the updater 4 identifies one of the controlled instruments connected to the field network 26 as a transmission destination of the control software.

At the next step S105, the upper-level controller 21 transmits, through the field network 26, the control software received at step S104 to the controlled instrument identified as a transmission destination of the control software so as to cause the controlled instrument to perform the update sequence (update processing at the controlled instrument).

At the next step S106, the updater 4 causes the USB information transmitter-receiver 47 to make a request to the upper-level controller 21 for instrument information of the controlled instruments.

At the next step S107, the upper-level controller 21 obtains instrument information from controlled instruments that are connected to the field network 26 at the present point of time. Then, the upper-level controller 21 transmits the obtained instrument information to the updater 4.

At the next step S108, the updater 4 stores software update information in a storage. The software update information is comprehensive information made up of software update results and the license key. The software update results include the instrument information received at step S107 and an update history of control software (which includes version number, update date and time). The software update information is generated for each of the controlled instruments and includes a license key that corresponds to the control software stored in each individual controlled instrument.

At the next step S109, the updater 4 causes the USB information transmitter-receiver 47 to delete the decoded control software from the storage. It is noted that the license key is kept in the storage as part of the software update information. Thus, the update sequence ends.

In the above-described download sequence, a plurality of kinds of encoded control software may be stored in the storage. In this case, the deleting step at step S109 may include deleting only the decoded control software updated immediately before the deleting step, with the rest of decoded control software remain stored in the storage. It is also possible to delete all the decoded control software simultaneously after they are done with the update operation, or delete all the decoded control software simultaneously at the time of ending the tool application.

Upload Sequence of Software Update Information

Figure 6:
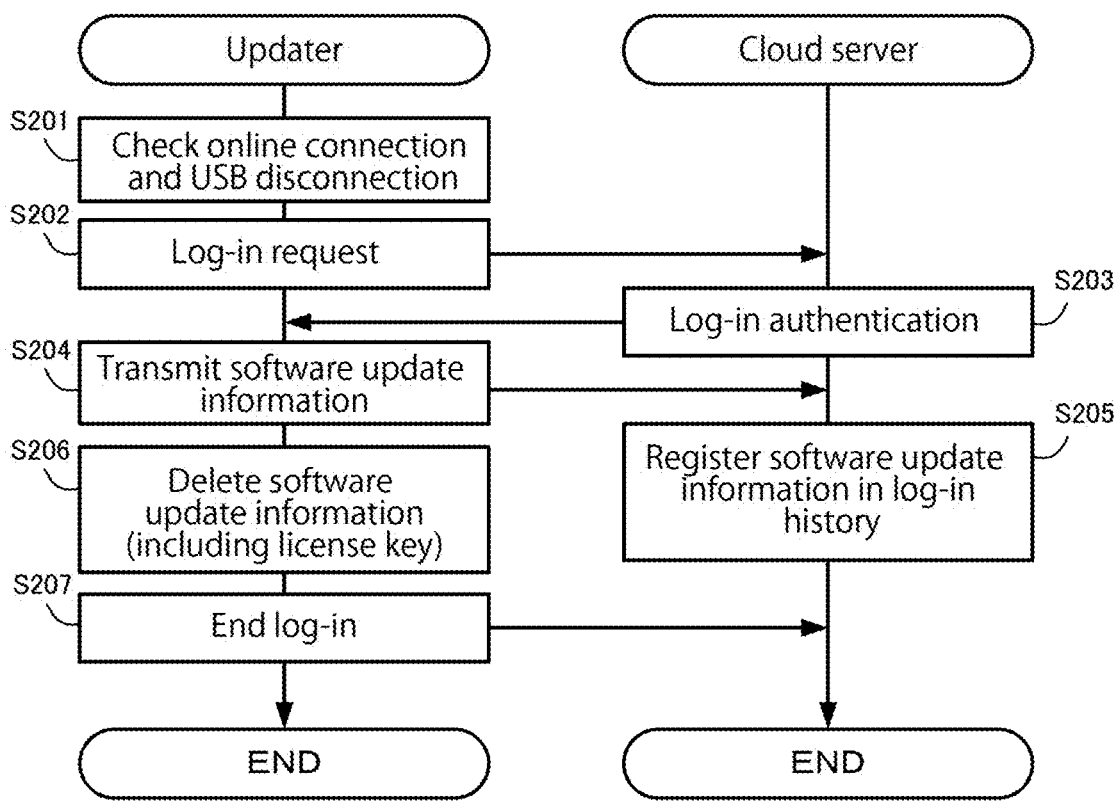
FIG. 6 is a sequence chart of a process of uploading, to a cloud server, software update information of a controlled instrument connected to a field network.

FIG. 6 is a sequence chart of a process of uploading performed in the software management system 1 according to this embodiment. In the process of uploading, software update information of a controlled instrument connected to the field network 26 is uploaded to the cloud server 3. The upload sequence illustrated in FIG. 6 starts if software update information is stored in a storage as a result of the update sequence illustrated in FIG. 5 and if the updater 4 is disconnected from the Internet 5 and connected to the upper-level controller 21 through the USB cable 27.

At step S201, the updater 4 checks its connection state at the present point of time. Specifically, the updater 4 checks whether the updater 4 is connected to the Internet 5 and is not connected to the upper-level controller 21 through the USB cable 27. When, at the present point of time, the updater 4 is not connected to the Internet 5 or when the updater 4 is connected to the upper-level controller 21, the updater 4 makes an error notification to the user and causes the tool application 41 to end its processing (not illustrated).

At the next step S202, the updater 4 causes the Internet information transmitter-receiver 42 and the log-in requester 43 to access the cloud server 3 through the Internet 5 and transmit account information to the cloud server 3, thereby making a log-in request to the cloud server 3.

At the next step S203, the cloud server 3 causes the server information transmitter-receiver 39 and the log-in authenticator 34 to check the received account information for log-in eligibility and to, when the received account information is determined as log-in eligible, transmit log-in permission to the updater 4. When the received account information is determined as not log-in eligible, the cloud server 3 causes the server information transmitter-receiver 39 and the log-in authenticator 34 to transmit a log-in error to the updater 4 (the log-in error is not illustrated).

At the next step S204, the updater 4 causes the Internet information transmitter-receiver 42 to transmit (upload) to the cloud server 3 the software update information stored at step S108 of the above-described update sequence.

At the next step S205, the cloud server 3 causes the server information transmitter-receiver 39 and the log-in history manager 35 to register the received software update information in the log-in history database 33 in correlation to the present log-in account information (see FIG. 7, described later).

At the next step S206, the updater 4 causes the Internet information transmitter-receiver 42 to delete the software update information from the storage.

At the next step S207, the updater 4 causes the Internet information transmitter-receiver 42 to transmit a log-in end notification to the cloud server 3. Thus, the upload sequence ends.

Registered Items of Log-In History Database

FIG. 7 illustrates exemplary registered items of the log-in history database 33 registered at step S12 of the above-described download sequence and at step S205 of the above-described upload sequence, and illustrates an example of how the registered items are shown. The exemplary registered items illustrated in FIG. 7 are prepared on a production-factory-6 basis (see FIG. 1), and those log-in users who have been proved to be workers in the production factory 6 are permitted to access, browse, and update the registered items. The exemplary registered items, headed by "No." indicating the time of log-in operation, include "Log-in date and time", "Log-in user", "Instrument type", "Software version" (version number), "License key", "Download date", and "Update date".

In addition to the information associated with log-in to the cloud server 3, the items registered in the log-in history database 33 include information indicating the machine equipment 2 that the user is using, and information concerning the control software of the machine equipment 2. The registered item information associated with the machine equipment 2 can also be used as "traceability information", which is information associated with a history of the machine equipment 2. Specifically, while the user of the updater 4 is logged in the cloud server 3, the user is permitted to browse a set range of the traceability information at any desired timing (for example, the set range is the production factory 6 as a whole or on an individual machine instrument). This configuration, not illustrated, enables the user to check the update state of each controlled instrument and/or re-acquire a license key.

In the example illustrated in FIG. 7, a plurality of different users are assigned unique log-in accounts to log in the log-in history database 33, and the registered items shown are based on users who logged in using their unique log-in accounts. This configuration, however, is not intended in a limiting sense; how to show registered items may be varied by setting the log-in history manager 35 in a different manner. Specifically, items may be registered and shown on an individual-user basis or registered and shown on an individual-controlled-instrument basis, in the form of a table that gives a glance of all types of controlled instruments.

Advantageous Effects of this Embodiment

As has been described hereinbefore, the software management system 1 according to this embodiment includes the updater 4. While the updater 4 is connected to the Internet 5, the updater 4 receives control software from the cloud server 3 and stores the control software. While the updater 4 is connected to the field network 26, the updater 4 transmits the stored control software to a controlled instrument so as to cause the controlled instrument to update its control software using the stored control software. In this embodiment, the updater 4 is implemented in the form of a single, easy-to-carry laptop PC. With this configuration, the updater 4 becomes connected to the Internet 5 and downloads an upgraded version of necessary control software from the cloud server 3. Then, the updater 4 becomes indirectly connected to the field network 26 through the USB cable 27 and the upper-level controller 21 or through a USB cable and a motor controller 22 (this connection is not illustrated), and transmits the downloaded control software to the controlled instrument so as to cause the controlled instrument to update its control software using the downloaded control software. Thus, the updater 4 changes which network to connect itself to, to the Internet 5 or to the field network 26. This configuration enables update of control software by downloading a new version of the control software while keeping the updater 4 physically disconnected from the two networks. This configuration, as a result, improves the safety and readiness with which to update control software in the machine equipment 2, which is a control system without external connections.

In the embodiment illustrated in FIG. 1, the control software update sequence is performed with the updater 4 directly connected to the upper-level controller 21 through the USB cable 27. This configuration, however, is not intended in a limiting sense. Another possible embodiment is that the control software update sequence is performed with the updater 4 directly connected to a motor controller 22 through another USB cable. In this case, no update sequence is performed in the upper-level controller 21; instead, the update sequence is performed in the motor controller 22 and/or the controlled instruments lower in level than the motor controller 22 (such controlled instruments are the encoder 24 and the external sensors 25).

Also in this embodiment, the updater 4 performs processing in the tool application 41 only while the updater 4 is connected to either the field network 26 or the Internet 5. That is, the updater 4 performs no processing while the updater 4 is connected to both the field network 26 and the Internet 5 simultaneously; instead, the updater 4 performs its functions while the updater 4 is connected to either the field network 26 or the Internet 5. This configuration increases the reliability with which the disconnection between the two networks is maintained, resulting in improved security in the field network 26 of the machine equipment 2. It will be understood by those skilled in the art that the updater 4 may not necessarily be a general-purpose laptop PC, as in this embodiment, but may be an engineering tool that is capable, in hardware configuration, of both USB connection and Internet connection and that is an easy-to-carry, portable information terminal.

Some sensors in the machine equipment 2 may be installed at positions that make the sensors difficult or impossible to access without disassembling the machine equipment 2. In this case, directly connecting the updater 4 to such sensors can be a complicated task, even though the updater 4 is an easy-to-carry information terminal. In contrast, the upper-level controller 21 is generally capable of transmitting and receiving information to and from other controlled instruments through the field networks 26, and is in many cases installed at an easy-to-access position. In light of the circumstances, in this embodiment, the updater 4 is directly connected to the upper-level controller 21 through the USB cable 27 (which is not a network) and indirectly connected to the field network 26 through the upper-level controller 21. This configuration enables the updater 4 to directly update control software in the upper-level controller 21 and to indirectly update control software in the motor controller 22, the encoder 24, and the external sensors 25, no matter where these controlled instruments are positioned in the machine equipment 2, by indirectly transmitting control software to these controlled instruments through the upper-level controller 21 and the field network 26. This configuration advantageously facilitates the update work.

Also, in many applications, control software contains confidential technical information that needs to be prevented from leaking. For this purpose, it is necessary for only the user who downloaded the control software to be allowed to perform update work. In light of the circumstances, in this embodiment, the cloud server 3 transmits, to the updater 4 and through the Internet 5, control software encoded based on a predetermined license key and this license key. The updater 4 receives the control software and the license key at the Internet information transmitter-receiver 42, and displays the received license key at the license key display 44.

With this configuration, the user who has done the download operation writes the displayed license key down on the memo pad 7 or some other writing material. Thus, this user alone is able to decode the downloaded control software. For example, even if the downloaded control software in encoded state is copied in an unauthorized manner by a third person, no one except the downloading user is able to decode, use, and analyze the control software. This maintains the confidentiality of technical information and prevents technical information from being updated in an unauthorized manner. It will be understood by those skilled in the art that the license key may not necessarily be output in display form but may be output in printed form from a printer or in audio form using a synthetic sound outputting device (neither of which is illustrated).

Also in this embodiment, the license key display 44 of the updater 4 displays the license key for a logged-in period of time in which the control software and the license key are received, and upon end of the logged-in period of time, the license key display 44 deletes the license key from the storage of the updater 4. This configuration ensures that even if a third party makes unauthorized access to the updater 4 after the end of the logged-in period of time, the third party is not able to read the license key, since only the user who has undergone the log-in operation is able to write the license key on the memo pad 7 or some other writing material. Thus, the user is able to keep the license key to himself/herself, thereby ensuring confidentiality. It will be understood by those skilled in the art that the license key may be stored in the form of a hidden file that can be browsed only by a logged-in user. This configuration can be implemented by setting the OS of the updater 4, for example.

Also in this embodiment, the updater 4 includes the license key input portion 45, the decoder 46, and the USB information transmitter-receiver 47. The license key input portion 45 receives an input of a license key. The decoder 46 decodes received control software based on the input license key. The USB information transmitter-receiver 47 transmits the decoded control software to a controlled instrument through the field network 26 so as to cause the controlled instrument to update its control software using the decoded control software. This configuration ensures that even if a user has no knowledge of a necessary encryption algorithm, the control software is automatically decoded by inputting a license key and automatically transmitted to a controlled instrument so that the control software of the controlled instrument is automatically updated using the decoded control software.

Also in this embodiment, the USB information transmitter-receiver 47 of the updater 4 deletes the decoded control software from the storage after the update operation. This configuration ensures that even if a third party makes unauthorized access to updater 4 after the update operation, the third party is not able to read the decoded control software. Thus, the technical information contained in the control software is kept confidential and protected from unauthorized update. It will be understood by those skilled in the art that the decoded control software may be stored in the form of a hidden file that can be browsed and handled only by a logged-in user. This configuration can be implemented by setting the OS of the updater 4, for example.

Also in this embodiment, the cloud server 3 generates a license key every time the cloud server 3 receives a download request for control software. Then, the cloud server 3 encodes control software based on the license key and transmits the encoded control software. This configuration ensures that a license key is generated for each operation of downloading one of various kinds of control software. This configuration, in turn, ensures that even if different users decode or update the same control software of a controlled instrument, the control software is managed (decoded and updated) on an individual-user basis. Also, the license key can be used as ID to identify a file of downloaded control software according to log-in account, user, and/or download operation. While in this embodiment a license key is generated on a download-operation basis, this configuration is not intended in a limiting sense. For example, when there is a download request for a plurality of kinds of control software at a time, a license key may be generated for a file of each kind of control software so that each kind of control software is encoded individually.

Also in this embodiment, when there is a plurality of updaters 4, the cloud server 3 transmits control software to a logged-in updater 4 among the plurality of updaters 4. This configuration ensures that control software is transmitted only to an updater 4 of an authenticated, logged-in user. Thus, the technical information contained in the control software is kept confidential and protected from unauthorized update.

Also in this embodiment, the log-in history manager 35 of the cloud server 3 registers software information in the log-in history database 33. The software information, such as license key, instrument type, and version number, correlates transmitted control software with a logged-in user. This configuration ensures that the software information, which includes the license key of the downloaded control software, can be managed according to log-in account, user, and/or download operation.

Also in this embodiment, the updater 4 obtains instrument information associated with a controlled instrument, such as instrument type and update history, and transmits the instrument information to the cloud server 3. Then, the log-in history manager 35 of the cloud server 3 registers the received instrument information in the log-in history database 33. This configuration ensures that the instrument information, which is associated with the controlled instruments constituting the machine equipment 2, can be registered in the log-in history database 33 and managed as an integrated database of traceability information.

Also in this embodiment, the cloud server 3 transmits, to the updater 4 of a logged-in user, a log-in history corresponding to the log-in account of the user. This makes it possible to identify control software downloaded and/or updated by a user and thus to identify unauthorized downloading, unauthorized update, and/or other unauthorized operations.

Modifications

Modifications will be described below.

Modification 1: Two Updaters Connected to Different Networks

Figure 8:
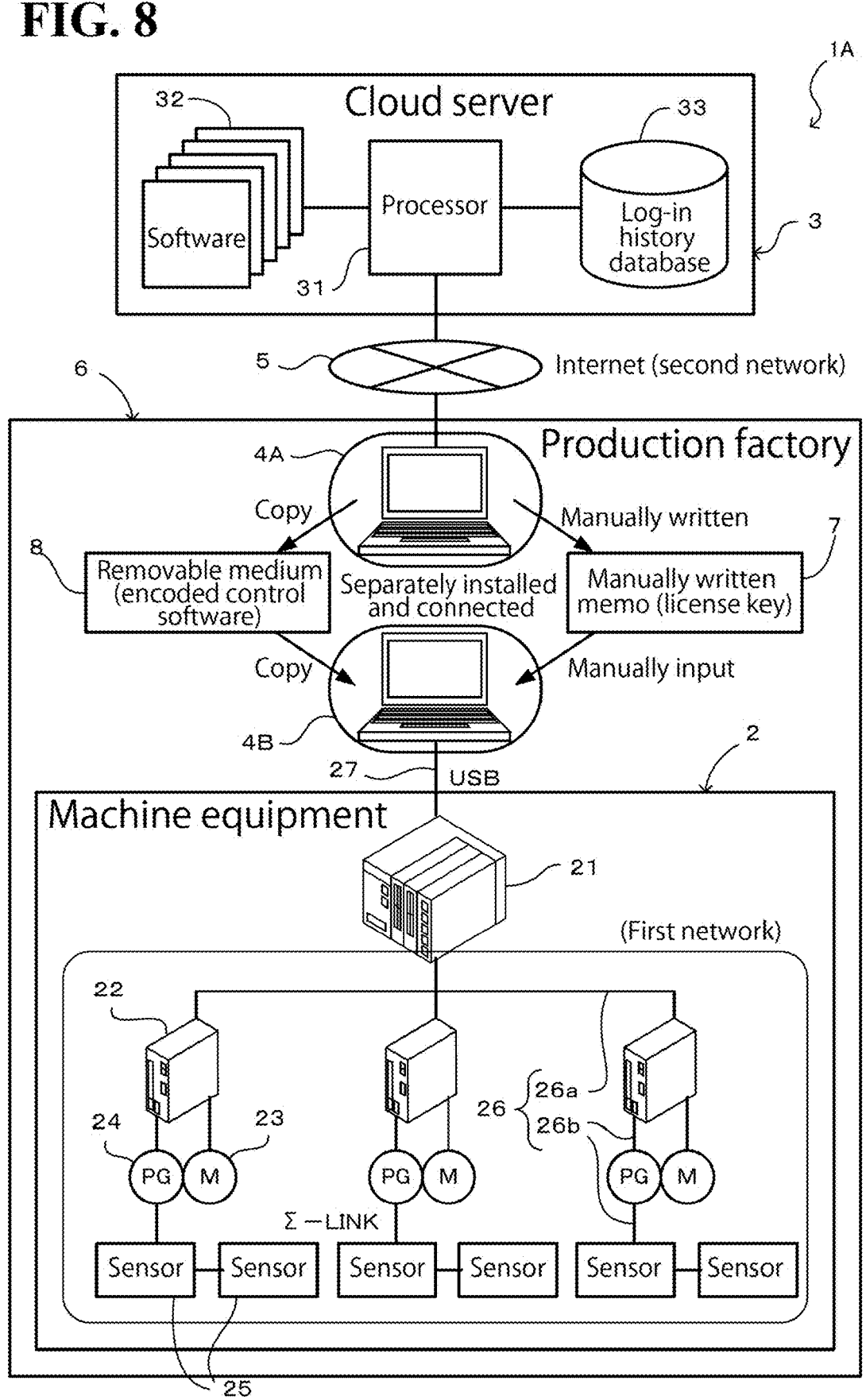
FIG. 8 is a functional block diagram schematically illustrating a configuration of a software management system according to a modification.

While in the above-described embodiment a single updater 4 changes which network to connect itself to, this configuration is not intended in a limiting sense. Another possible embodiment is illustrated in FIG. 8, where two independent first and second updaters 4A and 4B, which are general-purpose PCs, are respectively connected to two networks. The first updater 4A (first software updater) is connected to the Internet 5, and performs the download sequence of downloading encoded control software and a license key from the cloud server 3. Then, the first updater 4A records the control software in a removable medium 8 (recording medium), such as USB memory, USB connected HDD, compact disc recordable (CD-R), and digital versatile disc recordable (DVD-R), and displays the license key for the user to write the license key down on the memo pad 7 or some other writing material. The second updater 4B (second software updater) is connected to the field network 26 through the upper-level controller 21 and other elements, and reads the encoded control software through the removable medium 8. Then, the second updater 4B causes the user to manually input the license key written on the memo pad 7.

Thus, the software management system, 1A, according to this modification includes the first updater 4A and the second updater 4B. The first updater 4A is at any time connected to the Internet 5 and records control software received from the cloud server 3 in the removable medium 8. The second updater 4B is at any time connected to the field network 26, and reads the control software from the removable medium 8. Then, the second updater 4B transmits the control software to a controlled instrument so as to cause the controlled instrument to update its control software using the transmitted control software. The use of a recording medium media simplifies transfer of downloaded control software between the first updater 4A and the second updater 4B, which are at any time connected to the respective two networks, while ensuring that the first updater 4A and the second updater 4B are at any time physically disconnected from each other. Additionally, neither the first updater 4A nor the second updater 4B needs to be carried around and thus can be implemented by a fixed desktop PC, for example (not illustrated).

Modification 2: Additional Notes

In the above-described embodiment and modification, the machine equipment 2 is driven by the plurality of motors 23, and a single upper-level controller 21 is provided to control the driving of the machine equipment 2. This configuration, however, is not intended in a limiting sense. Another possible embodiment is that the machine equipment 2 includes a single motor 23, or a single upper-level controller 21 is provided to control the driving of a plurality of machine equipments 2.

It is also effective to cause the license key generator 37 of the processor 31 of the cloud server 3 to generate a license key correlated with a log-in account that a user uses at the time of log-in. In this case, the license key is stored in a controlled instrument together with decoded control software when the controlled instrument updates its control software using the decoded control software. When the instrument information of the controlled instrument is retrieved, the license key stored in the controlled instrument is also retrieved as part of the instrument information. With this configuration, when the instrument information (software update information) is uploaded to the cloud server 3, the cloud server 3 checks the license key included in the instrument information against the log-in account or another item so as to identify the actual user who updated the control software of the controlled instrument. This enables the cloud server 3 to determine whether there has been unauthorized acquisition or unauthorized update of control software.

The above-described embodiment and modifications are under the assumption that it is problematic for security reasons to directly connect a field network established in factories, plants, and other industrial facilities to a wide-area network such as the Internet. It is possible, contrary to the assumption, to at any time directly connect a field network to a cloud server through a wide-area network so that information can be transmitted and received between the field network and the cloud server, provided that security problems associated with the wide-area network have been cleared out and that there are no security problems on the side of the cloud server. In order to solve these security problems and ensure safety, however, it is often necessary to solve particular technical problems. If any of technical problems remains unsolved, leaving safety concerns, it would be more effective to apply the above-described embodiment and/or modifications.

As used herein, the terms "perpendicular", "parallel", and "plane" may not necessarily mean "perpendicular", "parallel", and "plane", respectively, in a strict sense. Specifically, the terms "perpendicular", "parallel", and "plane" mean "approximately perpendicular", "approximately parallel", and "approximately plane", respectively, with design-related and production-related tolerance and error taken into consideration.

Also, when the terms "simultaneously", "identical", "same", "equivalent", and "different" are used in the context of dimensions, magnitudes, sizes, or positions, these terms may not necessarily mean "simultaneously", "identical", "same", "equivalent", and "different", respectively, in a strict sense. Specifically, the terms "simultaneously", "identical", "same", "equivalent", and "different" mean "approximately simultaneously", "approximately identical", "approximately same", "approximately equivalent", and "approximately different", respectively, with design-related and production-related tolerance and error taken into consideration.

Otherwise, the above-described embodiments and modifications may be combined in any manner deemed suitable.

Obviously, numerous modifications and variations of the present disclosure are possible in light of the above teachings. It is therefore to be understood that within the scope of the appended claims, the present disclosure may be practiced otherwise than as specifically described herein.

What is claimed is:

1. A software management system, comprising:
   a control system connected to a first network and comprising at least one of control circuitry and a sensor, each controllable by updating first control software disposed in the respective at least one of the control circuitry and the sensor;

a software distribution device including first circuitry configured to store second control software and configured to transmit the second control software through a second network; and a software update device including second circuitry configured to, while the software update device is connected to the second network, receive the second control software and predetermined key data from the software distribution device and store the second control software and the predetermined key data, and while the software update device is connected to the first network, transmit the second control software to the respective at least one of the control circuitry and the sensor to cause the respective at least one of the control circuitry and the sensor to update the first control software using the second control software.

2. The software management system according to claim 1, wherein the second circuitry of the software update device is configured to operate while the software update device is connected to the first network or the second network.

3. The software management system according to claim 1, wherein the second circuitry of the software update device includes first update circuitry configured to control connection to the second network, receive the second control software from the software distribution device, and record the second control software in a predetermined recording medium, and second update circuitry configured to control connection to the first network, read the second control software from the predetermined recording medium, and transmit the second control software to the respective at least one of the control circuitry and the sensor through the first network to cause the respective at least one of the control circuitry and the sensor to update the first control software using the second control software.

4. The software management system according to claim 1, wherein the software update device is connected to the first network in an indirect manner through the control circuitry.

5. The software management system according to claim 1, wherein the first circuitry of the software distribution device is configured to encode the second control software based on the predetermined key data and configured to transmit the encoded second control software and the predetermined key data, and the second circuitry of the software update device is further configured to receive the encoded second control software and the predetermined key data from the software distribution device through the second network, and output the received predetermined key data.

6. The software management system according to claim 5, wherein the second circuitry is further configured to output the predetermined key data during a logged-in period of time during which the encoded second control software and the predetermined key data are received, and upon end of the logged-in period of time, the second circuitry is further configured to delete the predetermined key data.

7. The software management system according to claim 5, wherein the second circuitry of the software update device is further configured to input key data, receive the encoded second control software, decode the encoded second control software based on the input key data, transmit the decoded second control software to the respective at least one of the control circuitry and the sensor through the first network, and cause to the respective at least one of the control circuitry and the sensor to update the first control software using the decoded second control software.

8. The software management system according to claim 7, wherein the second circuitry is further configured to delete the decoded second control software after the first control software has been updated.

9. The software management system according to claim 5, wherein the first circuitry of the software distribution device is further configured to generate another key data every time the software distributor receives a request for the second control software, encode the second control software based on the another key data, and transmit the encoded second control software.

10. The software management system according to claim 1, wherein the software update device comprises a plurality of second circuits, and the first circuitry of the software distribution device is configured to transmit the second control software to a logged-in second circuit among the plurality of second circuitry.

11. The software management system according to claim 10, wherein the first circuitry of the software distribution device is configured to generate the predetermined key data based on a log-in account of a logged-in user.

12. The software management system according to claim 10, wherein the first circuitry of the software distribution device is configured to register software information in a log-in history, the software information correlating the second control software transmitted by the software distribution circuitry with a logged-in user.

13. The software management system according to claim 12, wherein the second circuitry of the software update device is configured to obtain instrument information associated with the respective at least one of the control circuitry and the sensor and is configured to transmit the instrument information to the software distribution circuitry, and the first circuitry of the software distribution circuitry is configured to register the received instrument information in the log-in history.

14. The software management system according to claim 12, wherein the first circuitry of the software distribution device is configured to transmit, to the logged-in user, the log-in history corresponding to a log-in account of the logged-in user.

15. A software update device, comprising:
circuitry configured to receive encoded control software and predetermined key data, the encoded control software being encoded based on the predetermined key data, decode the encoded control software based on the predetermined key data, and cause at least one of a control circuitry and a sensor to update control software of the respective at least one of the control circuitry and the sensor using the decoded control software,
wherein the circuitry is configured to receive the encoded control software and predetermined key data from a software distribution device while connected to a first network and to store the encoded control software and predetermined key data, and transmit the decoded control software to the respective at least one of the control circuitry and the sensor while connected to a second network.

16. A software updating method executable by software update device, comprising:
receiving encoded control software and predetermined key data while circuitry is connected to a first network, the encoded control software being encoded based on the predetermined key data;
inputting the received predetermined key data;
decoding the received control software based on the input predetermined key data; and transmitting the decoded control software, by the circuitry, to at least one of a control circuitry and a sensor while connected to a second network;

causing the respective at least one of the control circuitry and the sensor to update the control software of the respective at least one of the control circuitry and the sensor using the decoded control software.

17. A non-transitory computer-readable storage medium storing a software update program for causing an arithmetic and/or logic operator of a software update device to execute processing comprising:

receiving encoded control software and predetermined key data while circuitry is connected to a first network, the encoded control software being encoded based on the predetermined key data;

inputting the received predetermined key data;

decoding the received control software based on the input predetermined key data; and transmitting the decoded control software, by the circuitry, to at least one of a control circuitry and a sensor while connected to a second network;

causing the respective at least one of the control circuitry and the sensor to update control software of the respective at least one of the control circuitry and the sensor using the decoded control software.

18. The software management system according to claim 2, wherein the software update device is connected to the first network in an indirect manner through the control circuitry.

19. The software management system according to claim 3, wherein the software update device is connected to the first network in an indirect manner through the control circuitry.

20. The software management system according to claim 2, wherein the first circuitry of the software distribution device is configured to encode the control software based on the predetermined key data and configured to transmit the encoded control software and the predetermined key data, and the second circuitry of the software update device is further configured to receive the encoded control software and the predetermined key data from the software distribution device through the second network, and output the received key data.

* * * * *